United States Patent
Dumont et al.

(10) Patent No.: US 7,088,993 B2
(45) Date of Patent: Aug. 8, 2006

(54) OPTIMIZED MESSAGE NOTIFICATION

(75) Inventors: Jim Dumont, Dollard des Ormeaux (CA); Bernhard Meier, St. Lazare (CA)

(73) Assignee: Telefonaktiebolaget LM Ericsson(publ), Stockholm (SE)

( * ) Notice: Subject to any disclaimer, the term of this patent is extended or adjusted under 35 U.S.C. 154(b) by 218 days.

(21) Appl. No.: 10/668,335

(22) Filed: Sep. 24, 2003

(65) Prior Publication Data
US 2005/0064884 A1  Mar. 24, 2005

(51) Int. Cl.
H04M 1/663 (2006.01)
(52) U.S. Cl. ............... 455/412.2; 455/412.1; 455/466; 455/413; 455/459
(58) Field of Classification Search ............. 455/412.1, 455/412.2, 414.1, 466, 413, 459; 709/245, 709/238, 226, 206, 229–230, 203, 224
See application file for complete search history.

(56) References Cited

U.S. PATENT DOCUMENTS 6,871,214 B1 * 3/2005 Parsons et al. ............. 709/206
2001/0005859 A1 * 6/2001 Okuyama et al. ........... 709/245
2004/0267884 A1 * 12/2004 Sar-Shalom ................ 709/206
2005/0033852 A1 * 2/2005 Tenhunen ................... 709/229

* cited by examiner

*Primary Examiner*—Erika A. Gary
*Assistant Examiner*—Wayne Cai
(74) *Attorney, Agent, or Firm*—Alex Nicolaescu, Ericsson Canada Inc.

(57) ABSTRACT

A method, system and server for selectively sending out notification to a message recipient when a new message is available for retrieval. A sender sends a message to a recipient. A first server receives the message and detects a condition for forwarding the message to a second server. The first server further detects an internal setting for sending or not sending a notification alerting the recipient of the presence of the message. Based on this setting, the first server inserts an indication in a copy of the message that is forwarded to the second server. Upon receipt of the copied message by the second server, the former knows whether or not the first server has already issued a notification to the recipient, and uses this information for selectively sending out a notification only in cases where the first server has not sent such notification.

17 Claims, 3 Drawing Sheets

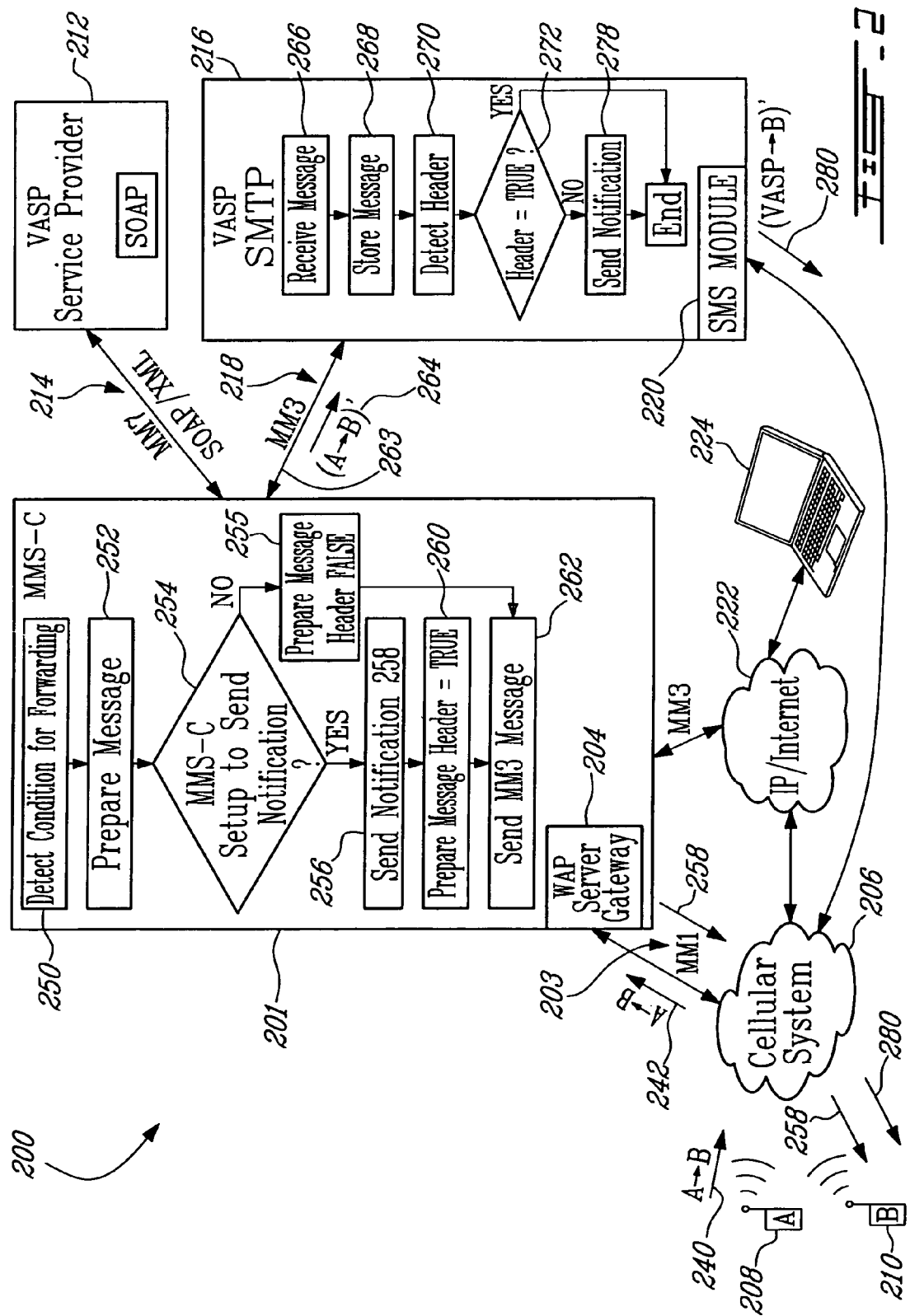

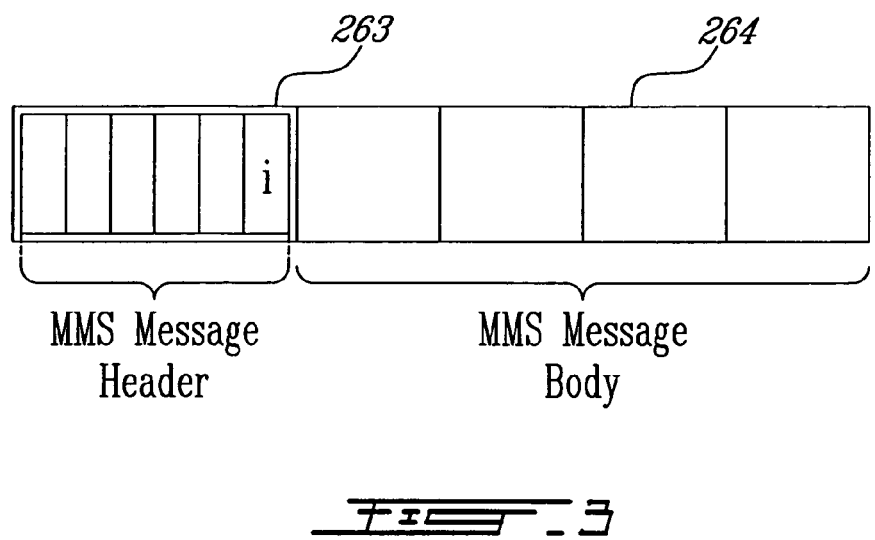

OPTIMIZED MESSAGE NOTIFICATION

BACKGROUND OF THE INVENTION

1. Field of the Invention

The present invention relates to a method, system and messaging service center for sending optimized MMS notifications.

2. Description of the Related Art

The Short Messaging Service (SMS) has been launched in 1992 and has become the most successful wireless data service to date. Typically, SMS allows mobile phone users to send and receive text messages of up to 160 characters in a cost and time-efficient manner. SMS is a "store and forward" service, meaning that messages are not sent directly between users but via an SMS centre. SMS may also be used to notify users of incoming e-mail, voice mail or faxes, as well as to inform them about weather forecasts, news headlines, stock quotes or other events they can subscribe to.

Multimedia Messaging Service (MMS) is the pinnacle of the messaging evolution. Currently being defined and specified by the Third Generation Partnership Project (3GPP) as a standard for $3^{rd}$ Generation (3G) implementation, MMS completes the potential of messaging and is becoming the preferred messaging method of mobile terminal users, since there are virtually no limits to the content of an MMS transmission. An MMS message may contain formatted text, graphics, data, animations, images, audio clips, voice transmissions and video sequences. Sending digital postcards and PowerPoint™-style presentations is expected to be among the most popular user applications of MMS. Greatly anticipated by young users in particular, MMS is projected to fuel the growth of related market segments.

Although MMS is a direct descendant of SMS, the difference in content is substantial. The size of an average SMS message is about 140 bytes, while the average size of an MMS message can be (in the early stages of MMS development) around 30,000 bytes, but is actually unlimited. As MMS is developed, users will be able to store a large number of messages, including those with video clips. The size of these messages may easily reach 100,000 bytes.

MMS uses the Wireless Application Protocol (WAP) as its bearer technology and is being standardized and defined by the 3GPP release 4 TS 23.140 v4.0.0, as well as by the following three specifications form the WAP Forum:

the WAP MMS Architectural Overview;
the WAP MMS Client Transaction Specification, which defines the interactions between the phone and MMS server for sending and receiving MMS messages; and
the WAP MMS Encapsulation Specification, which defines the message content and the format of communication between the terminal and MMSC; all of which are herein included in their entirety by reference.

An MMS server is a server through which MMS messages are sent. It supports flexible addressing (to both normal phone numbers (MS-ISDN) and e-mail accounts), which makes the user interface more friendly and allows greater control for operators.

The MMS server, moreover, is responsible for the instant delivery feature of MMS. The MMS standard, just like SMS, offers store-and forward transmission (instant delivery) of messages, rather than a mailbox-type model. MMS is a person-to-person communications solution, meaning that the user gets the message directly into the mobile. He or she does not have to call the server to get the message downloaded to the mobile. Unlike SMS, the MMS standard uses WAP as its bearer protocol. MMS may be implemented with any of the high-speed data 3G transport technologies (such as for example EDGE, CDMA2000, W-CDMA, UMTS) and 2.5G GPRS, and supports a variety of image, video and audio formats to facilitate a complete communication experience.

A typical MMS server is typically referred in the industry as an MMS Centre (MMS-C), and comprises an MMS Server, an MMS Proxy-Relay and an MMS Store facility. The MMS-C is the central element of the MMS network architecture, providing the storage and operational support, enabling instant delivery of picture messages from terminal-to-terminal and terminal-to-e-mail, and supporting flexible addressing. The center's MMS Proxy-Relay interacts with the application being run on the MMS-enabled terminals to provide various messaging services. WAP is used as bearer of an MMS message between the MMS-C and the MMS client (application). A WAP Gateway is used for delivery and retrieval of messages-enabled terminal to provide various messaging services.

As MMS is a store-and-forward protocol, MMS messages are stored on the MMS server, which upon receipt of any new MMS message sends the recipient a notification using WAP Push (that may essentially consist of an SMS message). The notification triggers the receiving terminal to retrieves the message automatically (or depending on filters defined by the user) using a WAP GET command.

Newer MMS systems further comprise Value-Added Service Provider (VASP) severs that are connected to MMS-Cs and are used as multimedia libraries or repositories for the MMS users who desire to have online MMS storage libraries. The MMS server connects to such a VASP server, and relays to that VASP server incoming MMS messages addressed to users with subscriptions to the VASP. Acting as an MMS repository, the VASP too sends notifications to the end-user as soon as a new MMS message is deposited therein for a subscribed MMS user.

A problem arises with the current prior art implementations wherein an incoming MMS message transits through an MMS-C and is then forwarded and stored in a VASP MMS repository. In such an instance, as soon as the MMS-C receives the MMS message, it sends the recipient a first notification alerting the user of the new MMS message. As the message is further relayed from the MMS-C to the VASP MMS repository, it is stored therein, and the VASP MMS repository also sends, another, second notification to the same recipient for alerting of the presence of the same MMS message. This implementation results in a transmission of duplicate notifications for alerting of the existence of one single new MMS message.

Reference is now made to FIG. 1 (Prior Art) that shows a high-level network diagram of a typical prior art MMS system 100. The MMS system 100 typically comprises an MMS Center (MMS-C) 101, which is the server responsible for receiving and routing the MMS messages. An MM1 interface connects a WAP Server Gateway 103 of the MMS-C 101 to a cellular system 102 serving a first Mobile Station (MS) A 104 and a second MS B 106. It is understood that in an actual system many more than the two illustrated MSs may exist. Finally, the MMS-C 101 may further comprises an SMS component 105 for sending out SMS notifications about incoming messages to subscribers of MSs A 104 and B 106. The MMS system 100 may further comprise a first VASP 110 acting, for example, as a service provider for photo finishing that connects to the MMS-C 101 via an MM7 SOAP/XML interface 112. MM7 is an interface for submission and delivery of multimedia messages from user equipment to a VASP, like the VASP 110, wherein HTTP is used as the transport protocol and SOAP as the formatting language. Such a VASP may provide a photo finishing service for receiving and storing the subscriber's photos, thus allowing later access by the subscriber to high-quality printing and photo finishing services such as postcard arrangement, T-Shirt printing, etc. Another VASP 116 is also connected to the MMS-C 101 via an MM3 interface 117 and acts as a Simple Mail Transfer Protocol (SMTP) server and an MMS repository for certain subscribers. The MM3 interface 117 is a communications interface external or non-MMS for sending and retrieving multimedia messages from servers of external messaging systems connected to MMS servers, such as for example SMTP servers, SMPP servers, POP3 servers, IMAP4 servers, etc. The exemplary VASP SMTP service provider 116, also called herein a VASP MMS repository 116, comprises an SMS interface module 118 that connects to the cellular system 102. Finally, an IP/Internet network 120 may connect to the MMS-C 101, the cellular system 102 and a terminal PC 122 that belongs to the same user of the MS B 106. For the purpose of the present exemplary scenario, it is also assumed that the user of the MS B 106 has activated an auto-forwarding feature for incoming MMS messages, wherein each one, or a selection of the incoming MMS message are forwarded by the MMS-C 101 to the VASP MMS repository 116.

With reference being further made to FIG. 1 (Prior Art), when the user of the MS A 104 sends an MMS message intended for the user of the MS B 106, the new MMS message is first transmitted to the cellular system 102, action 140, the MMS-C 101 receives the message, and replies back to the MS B 106 with a notification alerting of the receipt of the new message, action 142. Further, the MMS-C 101 forwards a copy of the MMS message received from MS A 104 to the VASP MMS repository 116, action 144. The VASP MMS repository 116 receives the copy of the MMS message, saves the message, action 146, and also sends another, second notification to the MS B 106 for alerting of the existence of a new message, action 148.

As it will be apparent for those skilled in the art, with the current implementations of MMS systems, a problem occurs as soon as an MMS message transits in more than one MMS server, as the recipient of the MMS message, which in the present scenario is the user of the MS B 106 receives duplicate notifications alerting of the existence of the same single MMS message.

Accordingly, it should be readily appreciated that in order to overcome the deficiencies and shortcomings of the existing solutions, it would be advantageous to have a method and system for harmonizing the message notifications that are sent in relation with a new MMS message. The present invention provides such a method and system.

SUMMARY OF THE INVENTION

In one aspect, the present invention is a method for sending message notification to a recipient of a message, the method comprising the steps of:
a) upon receipt of a message destined to a recipient at a first server, determining whether or not a notification is to be sent to the recipient for alerting of the presence of the message at the first server;
b) based on a result of step b), selectively inserting in a copy of the message that is to be forwarded by the first server to a second server an indication representative of whether or not a notification was sent to the recipient of the message; and c) transmitting the copy of the message with the indication from the first server to the second server.

In another aspect, the present invention is a first server acting to receive a message destined to a recipient, and upon receipt of the message further acting to determine whether or not a notification is to be sent to the recipient for alerting of the presence of the message, the first server selectively inserting in a copy of the message that is to be forwarded to a second server an indication representative of whether or not a notification was sent by the first server to the recipient of the message, the first server transmitting the copy of the message with the indication to the second server.

In yet another aspect, the present invention is a communications system comprising:
a first server;
a second server;
wherein upon receipt of a message destined to a recipient at a first server, the first server determines whether or not a notification is to be sent to the recipient for alerting of the presence of the message at the first server, and based on a result of the determination the first server selectively inserts in a copy of the message that is to be forwarded to a second server an indication representative of whether or not a notification was sent to the recipient of the message, and transmits the copy of the message with the indication to the second server.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 2 is a high-level nodal operation and signal flow diagram of the preferred embodiment of the present invention; and FIG. 3 that shows an exemplary high-level illustration of an MMS message with an indication according to the preferred embodiment of the present invention

DETAILED DESCRIPTION OF THE PREFERRED EMBODIMENTS

Figure 1:
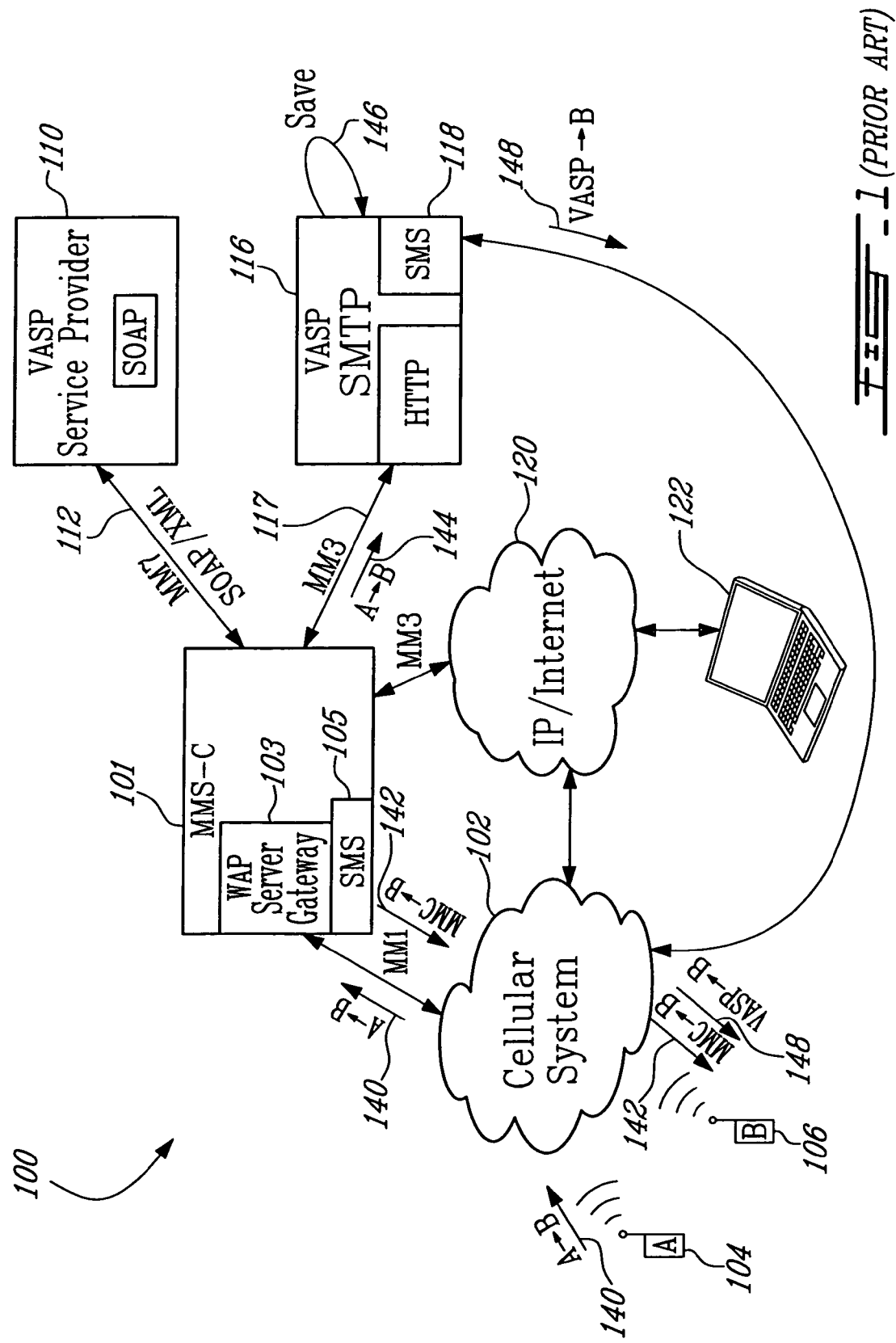
FIG. 1 (Prior Art) is a high-level network diagram of a typical prior art MMS system.

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

The present invention provides a simple yet efficient mechanism for insuring that only one MMS notification is sent to a recipient for one single MMS message, independent on the number of MMS servers, including VASPs, through which the MMS message has transited.

For this purpose, the invention proposes a mechanism that allows a first MMS server receiving a new MMS message to forward or copy the MMS message to a second server when there is such need, wherein the forwarded or copied MMS message includes an indication stating whether or not the first MMS server has issued a notification related to the receipt of the MMS message. When such forwarding is needed, such as for example when the MMS recipient has activated an auto-forwarding feature or automatic saving feature, the MMS server may re-format the MMS message so as to include such indication in the message header, and may relay the re-formatted MMS message with the indication to the second server.

Upon receipt of such a forwarded message, the second server analyses the MMS message header to detect whether or not a notification has been already issued for the present message to the MMS message recipient and, in the affirmative, refrains from sending a second notification. On the other hand, if no such notification was sent, the message header is indicative of this fact, and the second server can issue the notification for alerting the MMS message recipient of the existence of the new MSM message. Although the preferred embodiment of the present invention is herein described with reference being generally made to an MMS message that transits through a first and second server, those skilled in the art would readily appreciate that the invention is applicable to an MMS message, or to any other type of communication message, such as for example but not limited to an SMS message, an EMS (Enhanced Messaging Service) message, etc, that may transit through any number of servers, wherein when one of these servers sends out a notification to the message recipient, it also adds an indication to the message if forwards to other servers, to the effect that a notification has been already sent, so that the other server(s) in the message communication chain refrain from sending supplementary notifications for the same message.

Reference is now made to FIG. 2 that shows a high-level nodal operation and signal flow diagram illustrative of the preferred embodiment of the present invention. Shown in FIG. 2 is an MMS system 200 comprising an MMS Center (MMS-C) 201, which is the server responsible for the receiving and routing of the MMS messages. An MM1 interface 203 connects a WAP Server Gateway 204 of the MMS-C 201 to a cellular system 206 serving a first Mobile Station (MS) A 208 and a second MS B 210. It is understood that in an actual system many more than the two illustrated MSs may exist. The MMS system 200 may further comprise a first Value-Added Service Provider (VASP) 212 acting, for example, as a service provider for photo finishing that connects to the MMS-C 201 via an MM7 SOAP/XML interface 214 as described hereinbefore. Another VASP 216 is also connected to the MMS-C 201 via an MM3 interface 218 as previously described and acts as a Simple Mail Transfer Protocol (SMTP) server as well as an MMS repository for certain subscribers. The VASP SMTP service provider 216, herein also called a VASP MMS repository 216, comprises an SMS interface module 220 that connects to the cellular system 206, and that is responsible for sending out subscriber notifications alerting subscribers of incoming messages. Finally, an IP/Internet network 222 may connect to the MMS-C 201, the cellular system 206 and a terminal PC 224 that belongs to the same user of the MS B 210. For the purpose of the present exemplary scenario, it is also assumed that the user of the MS B 210 has activated an auto-forwarding or automatic-saving feature for at least a portion of incoming MMS messages, wherein each one of the incoming MMS message addressed to the user of the MS B 210 is forwarded by a first server, i.e. by the MMS-C 201 to a second server, i.e. to the VAS MMS repository 216 for storage purposes.

With reference being further made to FIG. 2, when the user of the MS A 208 sends an MMS message intended for the user of the MS B 210, the MMS message is first transmitted to the cellular system 206, action 240, and the MMS-C 201 receives the message in action 242. Once the MMS-C 201 receives the message, it begins processing the message, and in action 250 detects a condition for forwarding the MMS message to another destination, which in the present case is the VASP MMS repository 216. In action 252, the MMS-C 201 prepares to set-up the MMS message to be forwarded, and in action 254 it detects whether or not the current settings internal to the MMS-C 201 require the transmission of a notification to the recipient of the MMS message, which in the present exemplary scenario is the user of the MS B 210.

Assuming that the MMS-C 201 is set-up to send out notifications for each incoming MMS message, which correspond to the affirmative case of the detection 254, in action 256 the MMS-C 201 proceeds to the sending of a notification 258 that reaches the MS B 210 and alerts the user of the presence of a new MMS message ready to be retrieved.

The MMS-C 201 then prepares in action 260 the MMS message to be forwarded to the VASP MMS repository 216 by including in the yet-to-be-forwarded MMS message's header an indication i 263 that a notification has been already sent. This indication i 263 can be, for example, as simple as a value set to TRUE. In action 262, the MMS-C 201 sends out the forwarded MMS message 264 including the indication i 263 to the VASP MMS repository 216 via the MM3 interface 218.

Upon receipt of the forwarded message 264, action 266, the VASP MMS repository 216 stores the message, action 268, and in action 270 detects the type of the header it contains. In action 272, the VASP MMS repository detects the indication i 263 and that the value set in the header is TRUE, meaning that a notification related to this MMS message has been already sent out by the MMS-C 201, and therefore terminates the sequence of actions, i.e. it does not send out any new notification for this message.

In the opposite case, wherein in action 254 the MMS-C 201 is set-up not to send out notifications for incoming MMS message that are to be forwarded, the header information of the yet-to-be-forwarded MMS message is set to FALSE in action 255, and the MMS-C refrains form sending out any notification for this MMS message. Then, once the forwarded message 264 with the indication i 263 reaches the VASP MMS repository 216 as described, the former detects in action 272 that the header information value is set to FALSE, meaning that no notification has been sent out by the MMS-C 201, in which case it does send out a new notification 280 for the MS B 210, action 278.

Reference is now made to FIG. 3 that shows an exemplary high-level illustration of an MMS message 264 with the indication 263 according to the preferred embodiment of the present invention. The copied or forwarded MMS message 264, previously described with relation to FIG. 2, comprises a header portion and an MMS message body portion, wherein the header portion comprises the indication 263 showing whether a notification has been already sent for notifying the recipient subscriber of the existence of the MMS message. As mentioned, the indication i 263 may have various forms, including comprising a TRUE/FALSE value indicative of the sending of the notification.

It is apparent that with the present invention only one notification, notification 258 or the notification 280, reaches the MS B 210 for notifying of the existence of one single MMS message ready to be retrieved.

Those skilled in the art would readily appreciate that the notifications referred herein as notifications 258, 280 may be sent preferably as SMS messages, EMS messages, MMS messages, but that any other format may be used as well, such as for example but not limited to Direct HTTP PUSH messages.

Based upon the foregoing, it should now be apparent to those of ordinary skills in the art that the present invention provides an advantageous solution, which offers a harmonized message notification mechanism as it is described hereinbefore. Although the system and method of the present invention have been described in particular reference to certain radio telecommunications messaging standards (for example, MMS), it should be realized upon reference hereto that the innovative teachings contained herein are not necessarily limited thereto and may be implemented advantageously with any applicable messaging standard, such as MMS, SMS, EMS or other. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth herein below.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for sending a message notification to a recipient of a message, the method comprising the steps of:
   a) upon receipt of a message destined to a recipient at a first server, determining if a notification is to be sent to the recipient for alerting of the presence of the message at the first server;
   b) inserting in a copy of the message that is forwarded by the first server to a second server an indication specifying if the notification has been sent to the recipient of the message; and
   c) transmitting the copy of the message with the indication from the first server to the second server;
   whereby if the indication specifies that the notification is sent to the recipient by the first server the second server refrains from sending out another notification to the recipient, and if the indication specifies that the notification is not sent to the recipient by the first server the second server sends out a notification to the recipient.

2. The method claimed in claim 1 further comprising the steps of:
   d) upon receipt of the copy of the message at the second server, detecting the indication; and
   e) based on the indication, selectively sending out a notification to the message recipient;
   wherein if the indication specifies that the notification is sent to the recipient by the first server, the second server refrains from sending out another notification to the recipient, and if the indication specifies that the notification is not sent to the recipient by the first server, the second server sends out a notification to the recipient.

3. The method claimed in claim 2, wherein:
   the notification to the recipient is a message selected from the group of messages consisting of: a Short Message Service (SMS) message, and Enhanced Messaging Service (EMS) message, a Multimedia Messaging Service (MMS) message, and a direct HTTP Push message.

4. The method claimed in claim 2, wherein:
   the message is a Multimedia Messaging System (MMS) message;
   the first server is an MMS Center (MMS-C) server; and
   the second server is a Value Added Service Provider (VASP) server;
   wherein the MMS message is forwarded from the MMS-C to the VASP based on a detected condition for forwarding.

5. The method claimed in claim 4, wherein the detected condition for forwarding comprises an automatic forwarding feature activated by the MMS message recipient.

6. The method claimed in claim 1, wherein step a) of determining if a notification is to be sent to the recipient for alerting of the presence of the message at the first server is performed based on setting internal to the first server.

7. A first server acting to receive a message destined to a recipient, and upon receipt of the message further acting to determine if a notification is to be sent to the recipient for alerting of the presence of the message at the first server, the first server selectively inserting in a copy of the message that is forwarded to a second server an indication specifying if the notification is sent by the first server to the recipient of the message, the first server transmitting the copy of the message with the indication to the second server, whereby if the indication specifies that the notification is sent to the recipient by the first server, the second server refrains from sending out an other notification to the recipient, and if the indication specifies that the notification is not sent to the recipient by the first server, the second server sends out a notification to the recipient.

8. The first server claimed in claim 7, wherein the notification to the recipient is a message selected from the group of messages consisting of: a Short Message Service (SMS) message, and Enhanced Messaging Service (EMS) message, a Multimedia Messaging (MMS) service, and a direct HTTP Push message.

9. The first server claimed in claim 7, wherein:
   the message is a Multimedia Messaging System (MMS) message;
   the first server is an MMS Center (MMS-C) server; and
   the second server is a Value Added Service Provider (VASP) server;
   wherein the MMS message is forwarded from the MMS-C to the VASP based on a detected condition for forwarding.

10. The first server claimed in claim 9, wherein the detected condition for forwarding comprises an automatic forwarding feature activated by the MMS message recipient.

11. The first server claimed in claim 7, wherein the first server acts to determine if a notification is to be sent to the recipient for alerting of the presence of the message based on settings internal to the first server.

12. A communications system comprising:
    a first server;
    a second server;
    wherein upon receipt of a message destined to a recipient at a first server, the first server determines if a notification is to be sent to the recipient for alerting of the presence of the message at the first server, and the first server inserts in a copy of the message forwarded to a second server an indication specifying if a notification is sent to the recipient of the message, and transmits the copy of the message with the indication to the second server, whereby if the indication specifies that the notification is sent to the recipient by the first server the second server refrains from sending out another notification to the recipient and if the indication specifies that the notification is not sent to the recipient by the first server the second server sends out a notification to the recipient.

13. The communications system claimed in claim 12 wherein upon receipt of the copy of the message at the second server, the second server detects the indication, and based on the indication, selectively sends out a notification to the message recipient;

wherein if the indication specifies that a first notification is sent to the recipient by the first server, the second server refrains from sending out another notification to the recipient, and if the indication specifies that the notification has not been already sent to the recipient by the first server, the second server sends out a notification to the recipient.

14. The communications system claimed in claim 13, wherein:

the notification to the recipient is a message selected from the group of messages consisting of: a Short Message Service (SMS) message, and Enhanced Messaging Service (EMS) message, a Multimedia Messaging (MMS) service, and a direct HTTP push message.

15. The communications system claimed in claim 13, wherein:

the message is a Multimedia Messaging System (MMS) message;

the first server is an MMS Center (MMS-C) server; and the second server is a Value Added Service Provider (VASP) server;

wherein the MMS message is forwarded from the MMS-C to the VASP based on a detected condition for forwarding.

16. The communications system claimed in claim 15, wherein the detected condition for forwarding comprises an automatic forwarding feature activated by the MMS message recipient.

17. The communications system claimed in claim 13, wherein the first server uses settings internal to the first server for determining if a notification is to be sent to the recipient for alerting of the presence of the message.

* * * * *